Sept. 5, 1950 J. E. HANSEN 2,521,632
SPLIT ENDPIECE SPECTACLE CONSTRUCTION
Filed March 22, 1946
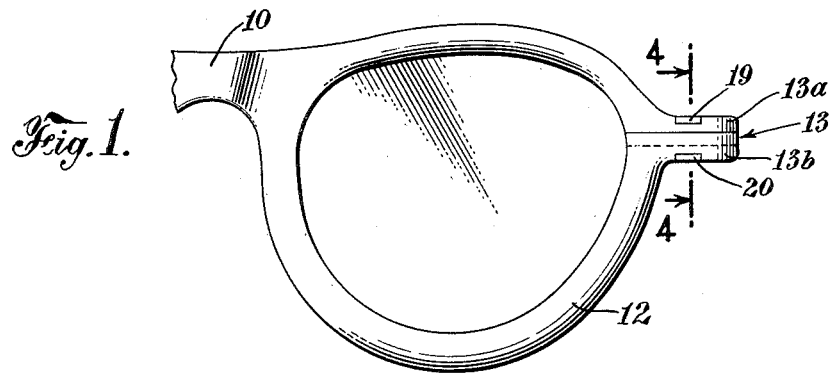
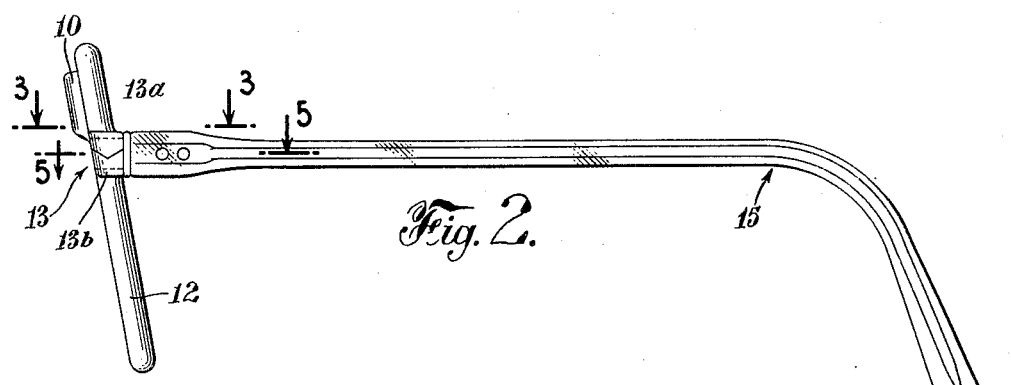
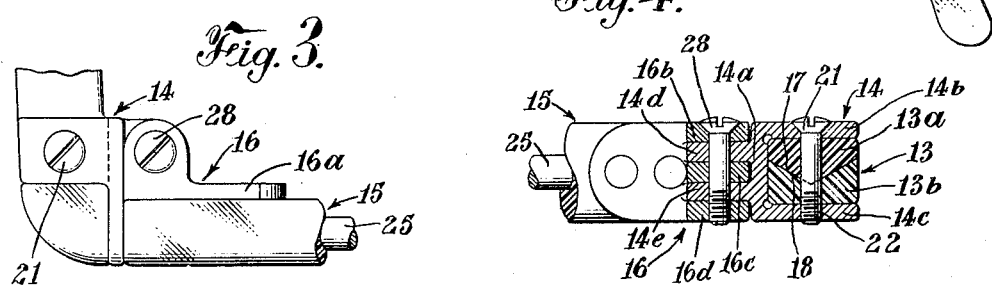
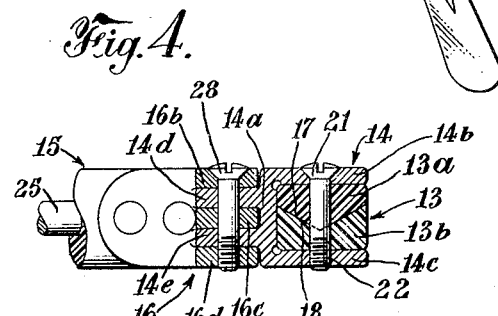
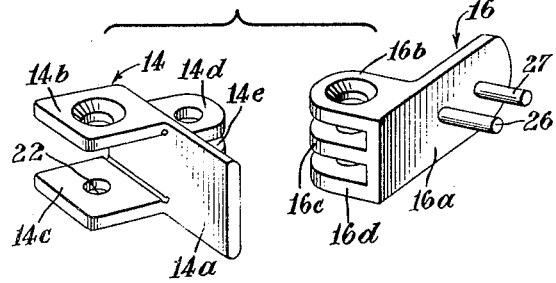
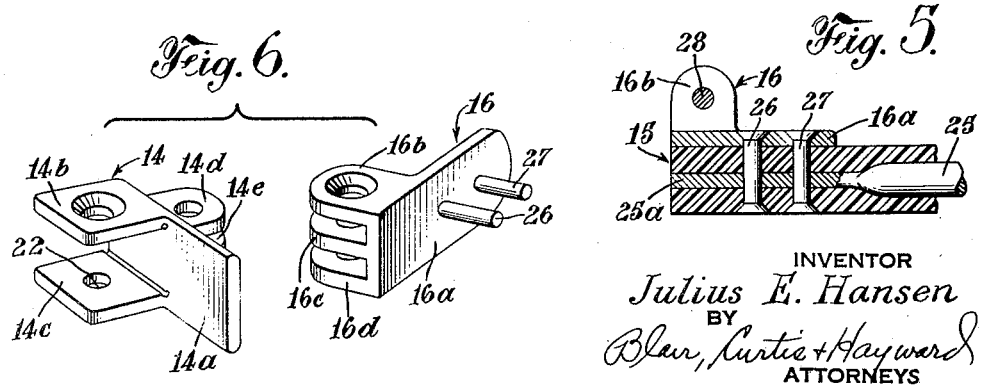
INVENTOR
*Julius E. Hansen*
BY
*Blair, Curtis & Hayward*
ATTORNEYS Patented Sept. 5, 1950

2,521,632

UNITED STATES PATENT OFFICE 2,521,632

SPLIT ENDPIECE SPECTACLE CONSTRUCTION

Julius E. Hansen, Providence, R. I., assignor to Bay State Optical Company, Attleboro, Mass., a corporation of Maine Application March 22, 1946, Serial No. 656,335

4 Claims. (Cl. 88—53)

This invention relates to an eyeglass construction.

One of the objects of this invention is to provide an eyeglass frame which is simple, practical and thoroughly durable. Another object is to provide a construction of the above character which will be neat and attractive in appearance. Another object is to provide a construction of the above character which may be manufactured from inexpensive materials with a minimum of labor costs. Another object is to provide an eyeglass construction of the above character which will be strong and well able to withstand continuous hard usage. Another object is to provide a construction of the above character which will be especially strong in certain vulnerable spots of the above type of construction. Another object is to provide a construction of the above character in which the structural elements are so disposed as to attain a high degree of strength without heavy construction. A further object is to provide a construction of the above character wherein certain parts may be easily disassociated for purposes of replacement or repair. A still further object is to provide a construction of the above character in which the temple is mounted on the frame by a simple yet strong connection. Other objects will be in part obvious and in part pointed out hereinafter.

The invention accordingly consists in the features of construction, combinations of elements and arrangements of parts as will be exemplified in the structure to be hereinafter described, and the scope of the application which will be indicated in the following claims.

In the accompanying drawings in which is shown one of the various possible embodiments of this invention, Figure 1 is a front elevation of a portion of a non-metallic eyeglass frame embodying my invention;

Figure 2 is a side elevation of the frame shown in Figure 1;

Figure 3 is a top plan view on an enlarged scale of the connection between the temple and endpiece of the frame shown in Figure 1;

Figure 4 is a vertical section on an enlarged scale taken on the line 4—4 of Figure 1;

Figure 5 is a horizontal section on an enlarged scale of the forward end of the temple shown in Figure 2 taken on the line 5—5 of Figure 2; and Figure 6 is an exploded perspective view on an enlarged scale of the metal fittings shown in Figure 3.

Similar reference characters refer to similar parts throughout the several views of the drawings.

As conducive to a clearer understanding of certain features of this invention, it might here be pointed out that this invention is particularly directed to a non-metal eyeglass frame in which the endpieces are formed in two sections to permit the rims to be separated at the endpieces so that the lenses can be mounted in the rims. In this type of construction, it is of major importance that the two sections of each of the endpieces be securely connected together and locked in that position so that the lenses cannot become loose in the frame. It also is important that the two sections of each endpiece be prevented from moving relatively with respect to each other when assembled as such movement places a strain upon the fitting holding the sections of each endpiece in assembled relationship. Furthermore, it is a well known fact that during use heavy strains are placed upon the point of connection of the temples to the frame. These strains are mainly caused by the fact that the temples are in fact levers; which when extended exert a "jacking action" upon the points of connection of the temples to the frame. A connection which will withstand this strain is of primary importance in the present frame because of the fact that the metal fittings not only serve to connect the temple to the frame but also hold the two sections of each rim in assembled relationship. It is accordingly another object of this invention to overcome the above-mentioned difficulties as well as many others.

It might here be noted that reference hereinafter to an "outward" direction signifies a direction to the left or right of the bridge of an eyeglass frame in the direction of the temples, while the term "inward" denotes a direction toward the bridge from one of the temples. A "rearward" direction refers to a direction toward the face of the wearer, whereas the term "forward" denotes the opposite direction, and an "upward" direction refers to a direction upwardly of the face of the wearer while a "downward" direction is opposite thereto.

In general, the non-metallic frame shown in Figures 1 and 2 includes a bridge 10, a pair of rims similar to rim 12, and a pair of endpieces similar to the endpiece generally indicated at 13. Endpiece 13 is divided into two sections 13a and 13b which are held in assembled relationship by a metal fitting generally indicated at 14 (Figures 3 and 4). The temple, generally indicated at 15 (Figure 2), is hingedly connected to fitting 14 by a metal fitting generally indicated at 16 (Figures 3 and 4).

As pointed out hereinabove it is important to construct the two sections 13a and 13b of endpiece 13 so that they cannot move relative to each other in a horizontal plane when in assembled relationship. To accomplish this, section 13a of the endpieces has on its lower surface a downwardly extending portion 17 which is V-shaped in cross section. The upper surface of the lower section 13b has a V-shaped groove 18 therein which is complementary to and into which the V-shaped portion 17 of the upper section 13a fits. Thus, when the upper and lower sections of endpiece 13 are in abutting relationship, the portion 17 of section 13a and the groove 18 in section 13b interlock so that movement of the endpiece sections 13a and 13b forwardly or rearwardly with respect to each other is prevented.

To hold endpiece sections 13a and 13b in assembled relationship after a lens has been inserted in rim 12 (Figure 1) metal fitting 14 (Figures 3 and 4) is provided. This fitting is U-shaped, and includes a back plate or foot portion 14a having a pair of integral ears or leg portions 14b and 14c formed thereon. It will be noted that ears 14b and 14c extend forwardly from the inner end of plate 14a and are substantially parallel with respect to each other. The inner and outer side walls of ears 14b and 14c are positioned substantially at right angles to back plate 14a. Furthermore, ears 14b and 14c are resilient in character so that they may be drawn toward each other as described hereinafter when the fitting is mounted on endpiece 13.

Endpiece 13 (Figure 1) is provided with a pair of grooves 19 and 20 extending transversely across the upper and lower surfaces of sections 13a and 13b. These grooves are aligned with respect to each other and are of a size to snugly receive ears 14b and 14c so that the side walls of ears 14b and 14c abut against the side walls of the grooves when the frame is assembled. When fitting 14 is to be mounted on endpiece 13, the two sections of the endpiece are moved into interlocking relationship and then ears 14b and 14c are slid into grooves 19 and 20 from the rear of the endpiece. When fitting 14 is thus positioned a screw 21 (Figures 3 and 4) is passed downwardly through ear 14b, through aligned holes in the two sections 13a and 13b of endpiece 13, and then is threaded into a threaded hole 22 (Figures 4 and 6) in ear 14c of fitting 14. When the fitting 14 is in place on endpiece 13, it will be seen that because of the shape and position of ears 14b and 14c on fitting 14 and because of the position and shape of the grooves on endpiece 13 the fitting 14 interlocks with the endpiece and prevents movement of the two sections thereof longitudinally with respect to each other. Thus a double interlock is formed, the projection and groove in the opposed surfaces of the endpiece sections preventing relative movement of the two sections in one direction and the interlock of the fitting with the endpiece preventing relative movement in the other.

When screw 21 is set, the shape of fitting 14 and its resiliency permits ears 14b and 14c to be drawn toward each other drawing the two sections of endpiece 13 tightly together. When the screw is tightened, the material of which endpiece 13 is made is slightly compressed and thus exerts pressure upon ears 14b and 14c. This serves to prevent screw 21 from loosening even under conditions of extended hard usage.

The temple fitting 16 (Figures 5 and 6) includes a flat plate portion 16a which is connected to temple 15 by a pair of rivets 26 and 27. Rivets 26 and 27 extend through the flattened end portion 25a of a temple reenforcing rod 25 and are headed over on the outer face of temple 15. Fitting 16 also includes three hinge knuckles 16b, 16c and 16d which extend inwardly from the forward end of plate 16a. These knuckles interfit with a pair of knuckles 14b and 14e (Figures 4 and 6) extending rearwardly from the inner portion of plate 14a of fitting 14. The hinge comprising knuckles 16b, 16c, 16d, 14d and 14e is held in assembled relationship by a screw 28 (Figure 4) which extends through the aligned holes in the upper hinge knuckles and threads into the lowermost hinge knuckle 16b.

It will be noted that the forward end of temple reenforcing rod 25 (Figure 5) extends forwardly to the forward end of temple 15. Thus, when temple 15 is in an open position, the forward end of rod 25 and plate 16a abut against plate 14a thus limiting movement of temple 15 in an outward direction. Furthermore because of the length of the base plate 14a of fitting 14, the strain of preventing further outward movement of temple 15 is spread over a large area on endpiece 13, and this greatly adds to the strength of the construction. Also the interlocking ears 14b and 14c of fitting 14 are of material assistance in absorbing the strains which arise when a frame is handled by its temples.

Thus an eyeglass frame construction has been described in which the two sections of endpiece 13 are interlocked to prevent movement of these sections with respect to each other and are held in this interlocked relationship by fitting 14. Fitting 14 is so constructed and the hinge connecting this fitting to the temple is so positioned that the construction is one which will absorb a maximum of continuous hard usage. A further advantage of this construction lies in the fact that the ears 14b and 14c are positioned in grooves in the top and bottom of the endpiece, and this completes the double interlock for holding the two sections against relative movement in any direction when the frame is assembled.

It will thus been seen that a thoroughly practical and efficient eyeglass construction has been described in which the several objects hereinabove mentioned, as well as many others, are successfully accomplished.

As many possible embodiments may be made of the above invention, and as many changes might be made in the embodiment above set forth, it is to be understood that all matter hereinabove set forth or shown in the accompanying drawing is to be interpreted as illustrative and not in a limiting sense.

What is claimed is:

1. In an eyeglass construction, in combination, a pair of non-metallic rim members, a bridge connecting said rim members, an endpiece portion integrally formed on each of said rim members, each of said endpiece portions being split in a horizontal plane into two sections, whereby said rims may be separated to permit the insertion of lenses therein, each of said endpiece portions having grooves therein extending transversely thereacross on the upper and lower surfaces thereof, said grooves having vertical parallel side walls, a pair of U-shaped resilient metal fittings, each including a foot portion and a pair of leg portions, the legs of said fittings being positioned in and interfitting with said grooves, said foot portions abutting against the rear surfaces of said endpiece portions, screw means connecting the leg portions of each of said fittings for securing said fittings to said endpiece portions, a pair of temples, and means hingedly connecting said temples to the foot portions of each of said fittings.

2. In an eyeglass construction, in combination, a pair of non-metallic rim members, a bridge connecting said rim members, an endpiece portion integrally formed on each of said rim members, each of said endpiece portions being split in a horizontal plane into two sections, whereby said rims may be separated to permit the insertion of lenses therein, each of said endpiece portions having grooves extending transversely thereacross on the upper and lower surfaces thereof, a pair of U-shaped metal fittings, each including a pair of leg portions and a foot portion of substantially greater width than the leg portions, said foot portions extending outwardly to the ends of said endpiece portions, the leg portions of each of said fittings being positioned in and interfitting with the grooves in each of said endpiece portions, the foot portions of each of said fittings abutting against the rear of each of said endpiece portions, screw means extending through the leg portions of each of said fittings and through said endpiece portions for securing said fittings to said endpiece portions, a pair of temples, and hinge means positioned adjacent the inner end of each of the foot portions of said fittings for connecting said temples to said fittings, the forward ends of said temples when said temples are in open position abutting against the outer sections of the foot portions of said fittings.

3. In an eyeglass construction, in combination, a pair of non-metallic rim members, a bridge connecting said rim members, an endpiece portion integrally formed on each of said rim members, each of said endpiece portions being split in a horizontal plane into two sections, whereby said rims may be split to permit the insertion of the lenses therein, one of the sections in each of said endpiece portions having a V-shaped projection formed thereon and the other section in each of said endpiece portions having a V-shaped groove therein adapted to receive said V-shaped projection, a pair of metal fittings for holding said endpiece portions in assembled relationship, each of said fittings being U-shaped and including a pair of leg portions and a foot portion, the top and bottom sections of each of said end-piece portions having grooves formed therein extending transversely across the upper and lower surfaces thereof from the front of each endpiece portion to its rear front, the foot portion of each fitting abutting against the rear surface of one of said endpiece portions each leg portion of each fitting being positioned in a groove, screw means to connect the leg portions of each of said fittings to the endpiece portion on which each fitting is mounted, a pair of temples, and means hingedly connecting said temple to said fittings.

4. In eyeglass construction, in combination, a pair of non-metallic rim members, a bridge connecting said rim members, an endpiece portion integrally formed on each of said rim members, each of said endpiece portions being split in a horizontal plane into two sections, whereby said rims may be separated to permit the insertion of lenses therein, each of said endpiece portions having grooves extending transversely thereacross on the upper and lower surfaces thereof, interlocking means formed on the abutting surfaces of said endpiece portion sections, said means interlocking when said sections are moved into abutting relationship with respect to each other, a pair of U-shaped metal fittings, each including a pair of leg portions and a foot portion, the leg portions of each of said fittings being positioned in and interfitting with the grooves in each of said endpiece portions, the foot portions of each of said fittings abutting against the rear of each of said endpiece portions, screw means extending through the leg portions of each of said fittings and through said endpiece portions for securing said fittings to said endpiece portions, a pair of temples, and hinge means hingedly connecting said temples to the foot portions of said fittings.

JULIUS E. HANSEN.

REFERENCES CITED

The following references are of record in the file of this patent:

UNITED STATES PATENTS

| Number | Name | Date |
|---|---|---|
| 452,008 | Willson | May 12, 1891 |
| 989,218 | Wells | Apr. 11, 1911 |
| 1,062,777 | Fox | May 27, 1913 |
| 1,342,973 | Shreiner | June 8, 1920 |
| 1,374,287 | Kunkelsberg | Apr. 12, 1921 |
| 1,556,371 | Stiriss | Oct. 6, 1925 |
| 1,698,047 | Boutelle | Jan. 8, 1929 |
| 1,708,199 | Welsh | Apr. 9, 1929 |
| 1,779,789 | Wells et al. | Oct. 28, 1930 |
| 1,953,922 | Bosworth | Apr. 10, 1934 |
| 2,281,812 | Uhlemann et al. | May 5, 1942 |

FOREIGN PATENTS

| Number | Country | Date |
|---|---|---|
| 328,921 | Germany | May 30, 1918 |